US012577756B2

(12) United States Patent
Garramone et al.

(10) Patent No.: US 12,577,756 B2
(45) Date of Patent: Mar. 17, 2026

(54) CONTROL METHOD FOR EXECUTING A FLOATING FUNCTION OF A BOOM, CORRESPONDING CONTROL SYSTEMS AND WORK VEHICLES COMPRISING SUCH CONTROL SYSTEMS

(71) Applicant: CNH Industrial Italia S.p.A., Turin (IT)

(72) Inventors: Adriano Garramone, Turin (IT); Andrea Gravili, Turin (IT); Stefano Liberti, Turin (IT); Antonio Venezia, Turin (IT)

(73) Assignee: CNH INDUSTRIAL ITALIA S.P.A., Turin (IT)

( * ) Notice: Subject to any disclaimer, the term of this patent is extended or adjusted under 35 U.S.C. 154(b) by 116 days.

(21) Appl. No.: 18/245,709

(22) PCT Filed: Sep. 16, 2021

(86) PCT No.: PCT/EP2021/075417
§ 371 (c)(1),
(2) Date: Mar. 16, 2023

(87) PCT Pub. No.: WO2022/058400
PCT Pub. Date: Mar. 24, 2022

(65) Prior Publication Data

US 2023/0358021 A1 Nov. 9, 2023

(30) Foreign Application Priority Data

Sep. 16, 2020 (IT) ........................ 102020000021808

(51) Int. Cl.
*E02F 9/22* (2006.01)
*E02F 9/26* (2006.01)
*F15B 13/044* (2006.01)

(52) U.S. Cl.
CPC ............ *E02F 9/2203* (2013.01); *E02F 9/265* (2013.01); *F15B 13/044* (2013.01); *F15B 2211/857* (2013.01)

(58) Field of Classification Search
CPC ......... E02F 9/2203; E02F 9/265; E02F 3/431; F15B 13/044; F15B 2211/857;
(Continued)

(56) References Cited

U.S. PATENT DOCUMENTS

2015/0368878 A1* 12/2015 Choi ..................... E02F 9/2292 701/50
2018/0002893 A1 1/2018 Heinzmann et al.
2021/0062460 A1* 3/2021 Chiba ................... E02F 9/2271

FOREIGN PATENT DOCUMENTS

EP 2799724 11/2014
EP 2955279 12/2015
(Continued)

OTHER PUBLICATIONS

International Search Report and Written Opinion dated May 4, 2021 for related Italian Application No. 102020000021808 (10 pages).

*Primary Examiner* — Tyler J Lee
(74) *Attorney, Agent, or Firm* — Rickard Demille

(57) ABSTRACT

A control method for executing a floating function of a boom in a work vehicle includes determining that a predetermined floating function activation command has been inputted by the operator by means of a command input means. When the floating function activation command has been inputted by the operator, acquiring, a signal or data indicative of the current position of the boom along a travel path of the boom over time, the travel path including a first section between a boom full extension position and a deceleration position, a second section between the deceleration position and a grounding position, and a third section between the grounding position and a full retract position, and moving the boom
(Continued)

from the current position, determined based on the signal or data indicative of the position of the boom, to the full retract position.

18 Claims, 5 Drawing Sheets

(58) Field of Classification Search
CPC ...... F15B 2211/3127; F15B 2211/3144; F15B 2211/327; F15B 2211/6313; F15B 2211/6346; F15B 2211/75; F15B 2211/755; F15B 2211/7741
See application file for complete search history.

(56) References Cited

FOREIGN PATENT DOCUMENTS

| | | |
|---|---|---|
| EP | 3584374 | 12/2019 |
| WO | 2010/054153 | 5/2010 |
| WO | 2013/103954 | 7/2013 |

* cited by examiner

CONTROL METHOD FOR EXECUTING A FLOATING FUNCTION OF A BOOM, CORRESPONDING CONTROL SYSTEMS AND WORK VEHICLES COMPRISING SUCH CONTROL SYSTEMS

CROSS-REFERENCE TO RELATED APPLICATIONS

This application is a national stage of PCT Application No. PCT/EP2021/075417, entitled "Control method for executing a floating function of a boom, a corresponding control systems, and a work vehicle comprising such control systems", filed Sep. 16, 2021, which claims priority from and the benefit of IT application No. 102020000021808, filed Sep. 16, 2020. Each of the foregoing applications is hereby incorporated by reference in its entirety.

TECHNICAL FIELD

The present invention relates generally to a work vehicle, such as for example a compact wheel loader, and particularly to a control method for executing a floating function of a boom, a corresponding control system and a work vehicle comprising such control system.

PRIOR ART

Motorized work vehicles are well known for use in material handling that carry an attachment (for example, a bucket) and have a hydraulically operated lifting arm for moving the attachment. Examples of such vehicles are tractors and loaders.

A loader is a heavy equipment machine used in construction to move aside on the ground or load materials such as asphalt, demolition debris, dirt, snow, feed, gravel, logs, raw minerals, recycled material, rock, sand, woodchips, etc. into or onto another type of machinery (such as a dump truck, conveyor belt, feed-hopper, or railroad car). There are many types of loader, which, depending on design and application, are called by various names, including attachment loader, front loader, front-end loader, payloader, scoop, shovel, skip loader, wheel loader, or skid-steer. In particular, compact wheel loaders are compact vehicles that have road wheels and carry a working attachment, such as an implement, attached to a lift arm or boom, that is hydraulically powered.

Referring to FIG. 1, a work vehicle 1, such as a compact wheel loader, is shown. However, the invention is not limited to such a kind of work vehicle, but is applicable to any other kind of work vehicle.

A compact wheel loader includes an attachment 2 connected to a frame 3 of the work vehicle for movement relative thereto. As shown, a boom 5 pivotally connected at one end on opposite sides of frame 3. The attachment 2 is pivotally connected at the opposite end of boom for tilting movement relative to the frame 3 about a generally horizontal axis. The above-described features form no substantial part of the present invention and are generally well known in the art. An attachment may be replaced in operation by any other implement or attachment.

Usually, the movement of the boom 5 and of the attachment 2 is controlled by the operator through a joystick 7 placed inside an operator's cab or cabin 9 of the work vehicle 1.

As can be seen in FIG. 2, which shows a control diagram of the work vehicle 1, the boom 3 and the attachment 2 are moved by an hydraulic control circuit 10 comprising a first and a second hydraulic actuators 12, 14 which are controlled by an electronic control unit 16 through respective solenoid valves 18, 20 according to the position of the joystick 7 controlled by the operator.

For example, each hydraulic actuator comprises at least one hydraulic cylinder operatively connected respectively to the boom and the attachment, that uses hydraulic power of a working fluid to facilitate mechanical operation, the working fluid being controlled by means of directional solenoid valves 18, 20. As liquids are nearly impossible to compress, a hydraulic actuator can exert a large force. The rate of actuation of the boom and attachment is controlled by the opening degree of the respective directional solenoid valve 18, 20 (e.g. open centre) by means of a driving current thereof as a function of the position of the joystick.

The hydraulic flow rate of the working fluid required to operate the boom and the attachment is produced by a hydraulic pump P connected to a fluid reservoir T and driven by an internal combustion engine or an electrical motor M (hereinafter simply referred to as motor) of the vehicle, e.g. by a mechanical linkage. The same motor is also used to drive the wheels as a propulsion means of the work vehicle.

FIG. 3 shows an exemplary joystick of a work vehicle. A movement of the joystick in an associated bi-dimensional control area A according to a first direction y causes the actuation of the boom and a movement of the joystick in said bi-dimensional control area A according to a second direction x causes the actuation of the attachment. The intersection of said x and y directions is defined as origin O of the control area A, and corresponds to the neutral position of the joystick.

A neutral region N around the neutral position of the joystick is a region where the boom and attachment are not actuated. A region externally surrounding the neutral region is defined a driving region and indicated D in this figure.

For example, according to the orientation depicted in FIG. 3, in an embodiment where the attachment is a bucket when the joystick is moved up from the origin O of the control area A according to the y direction the boom is lowered with respect to ground and when the joystick is moved down from the origin O according to the y direction the boom is lifted towards ground. Further, when the joystick is moved right from the origin O according to the x direction the attachment, is tilted towards a dumping position, and when the joystick is moved left from the origin O according to the x direction the attachment, is tilted towards a dig or rollback position and beyond.

A combination of movement in both directions x and y of the joystick is allowed in order to move simultaneously the boom and the attachment.

In known work vehicles, when the operator activates a floating function of the boom, such function connects the chambers of the boom cylinders to the fluid reservoir and relieves pump pressure, so that the boom is lowered according to the force of gravity.

In a first floating function according to the prior art, the attachment is lowered to a predetermined grounding position, for example by an automatic lowering control, and then the floating of the boom is activated. The grounding position being the position at which an attachment coupled to the boom touches the ground. In this way, the shock when the attachment is brought into contact with the ground may be limited. Disadvantageously, in such floating function according to the prior art:

- if the real contact position with ground, i.e. position in which the attachment touch the ground, is before the expected predetermined grounding position, the boom would be subjected to a shock because of the lowering operation of the boom;

if the real contact position is after the grounding position, there would be also a shock because the floating function is activated when the bucket is not close to the ground and it will fall down due to gravity in an uncontrolled way.

SUMMARY OF THE INVENTION

The aim of the present invention is to provide a solution that avoids the drawbacks of the prior art.

Particularly, an aim of the present invention is to reduce the possible shock to which the boom may be subjected during the execution of floating function of the boom.

According to the invention, this aim is achieved by a control method for executing a floating function of a boom in a work vehicle powered by a motor, having the features claimed in claim 1.

Preferred embodiments are defined in the dependent claims, whose content is also to be considered an integral part of the present description. Features of the dependent claims may be combined with the features of the independent claims as appropriate, and in combinations other than those explicitly set out in the claims.

Further subjects of the invention are control systems for a work vehicle powered by a motor, as well as work vehicles, as claimed.

In summary, with respect to what done by the prior art floating function, the boom float is activated when the bucket is in contact with ground, so when the operator activates the floating function in a higher boom position (with respect to a grounding position) the control system properly actuates the lowering spools to control the boom in order to not lower it for the sole effect of the gravity.

In other words, with this control strategy, the grounding position is always the real contact position (between the attachment coupled to the boom and the ground) and there is no shock because the boom is always decelerated before reaching the grounding position and the floating is activated only when the attachment coupled to the boom is really on the ground.

BRIEF DESCRIPTION OF THE DRAWINGS

Further functional and structural characteristics and advantages of the present invention are set out in the detailed description below, provided purely as a non-limiting example, with reference to the attached drawings, in which.

DETAILED DESCRIPTION

In the following description, unless otherwise defined, all terms (including technical and scientific terms) are to be interpreted as is customary in the art. It will be further understood that terms in common usage should also be interpreted as is customary in the relevant art and not in an idealized or overly formal sense unless expressly so defined herein. All orientation terms, such as upper and lower, are used in relation to the drawings and should not be interpreted as limiting the invention.

Figure 4:
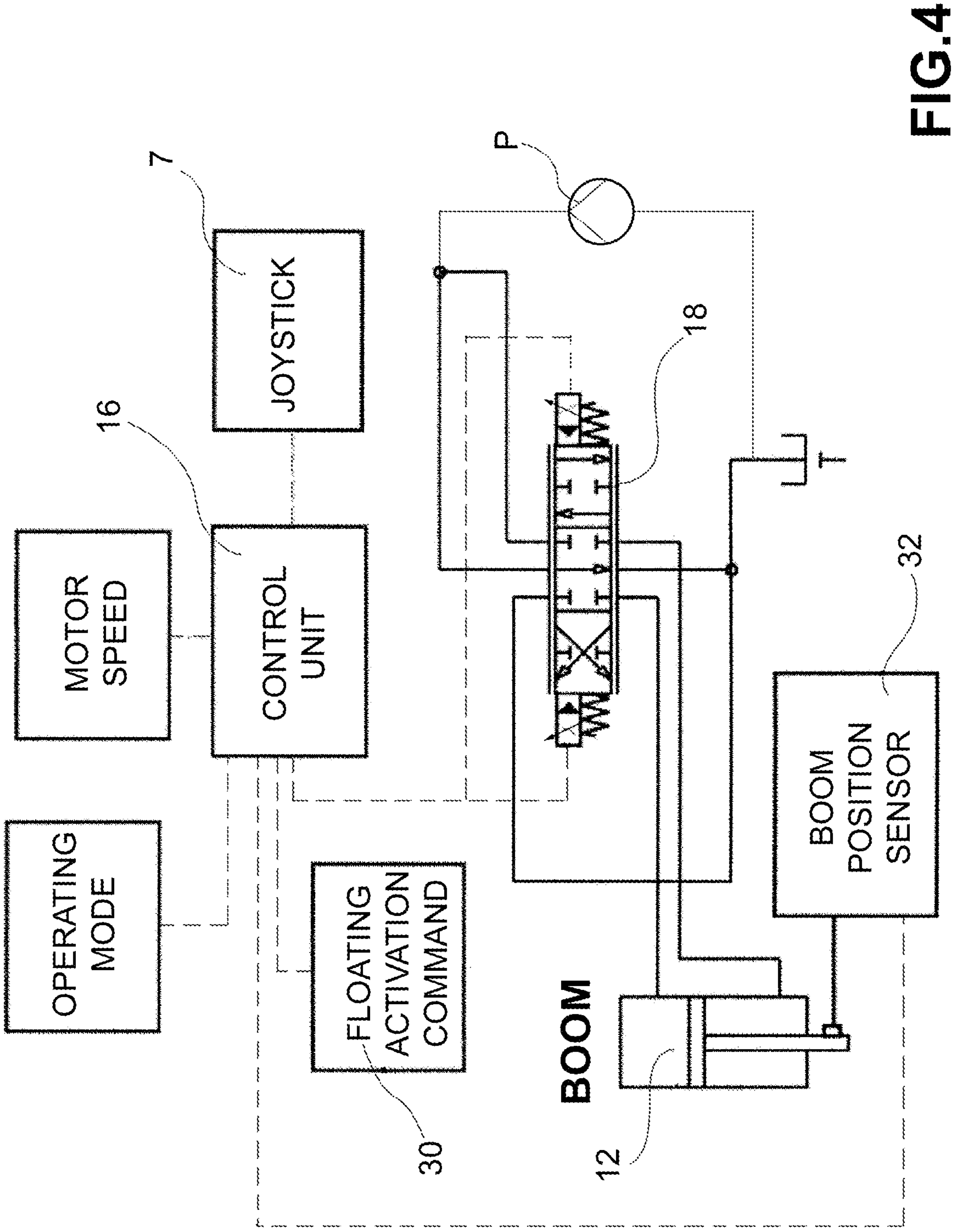
FIG. 4 shows a control diagram of a work vehicle according to the invention.
Figure 5:
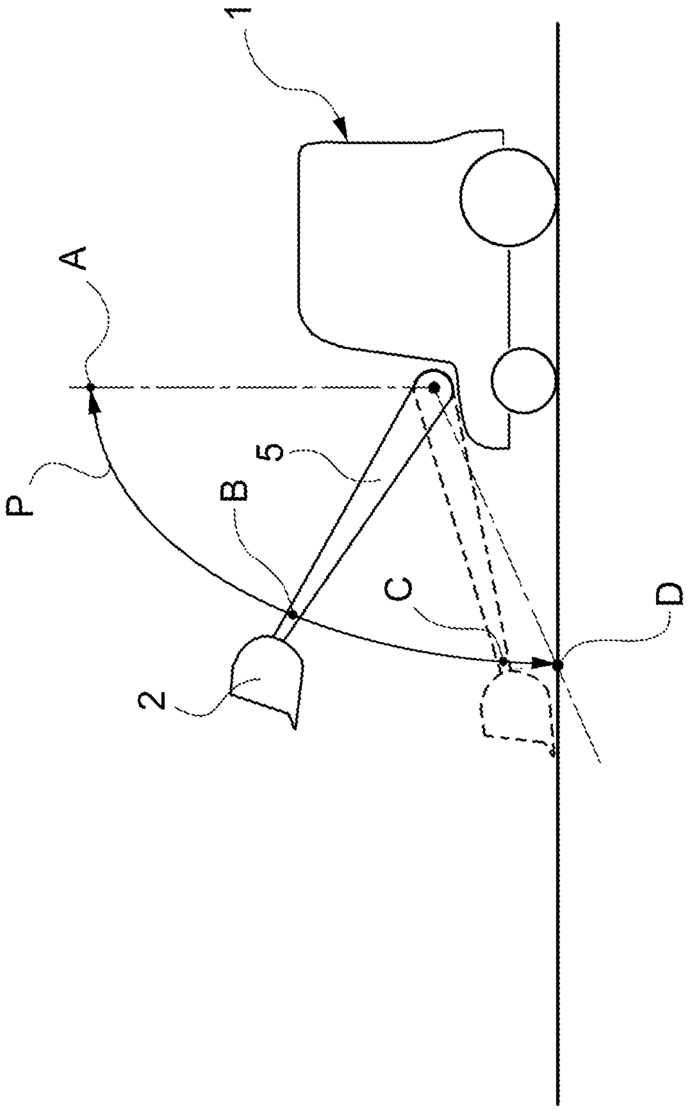
FIG. 5 shows an exemplary travel path of a boom.

In the following, a preferred embodiment of a control method for executing a floating function of a boom in a work vehicle powered by a motor is described. Reference is made to the control diagram of FIG. 4, where the electronic control unit 16 is configured to implement the control method of the invention.

Figure 1:
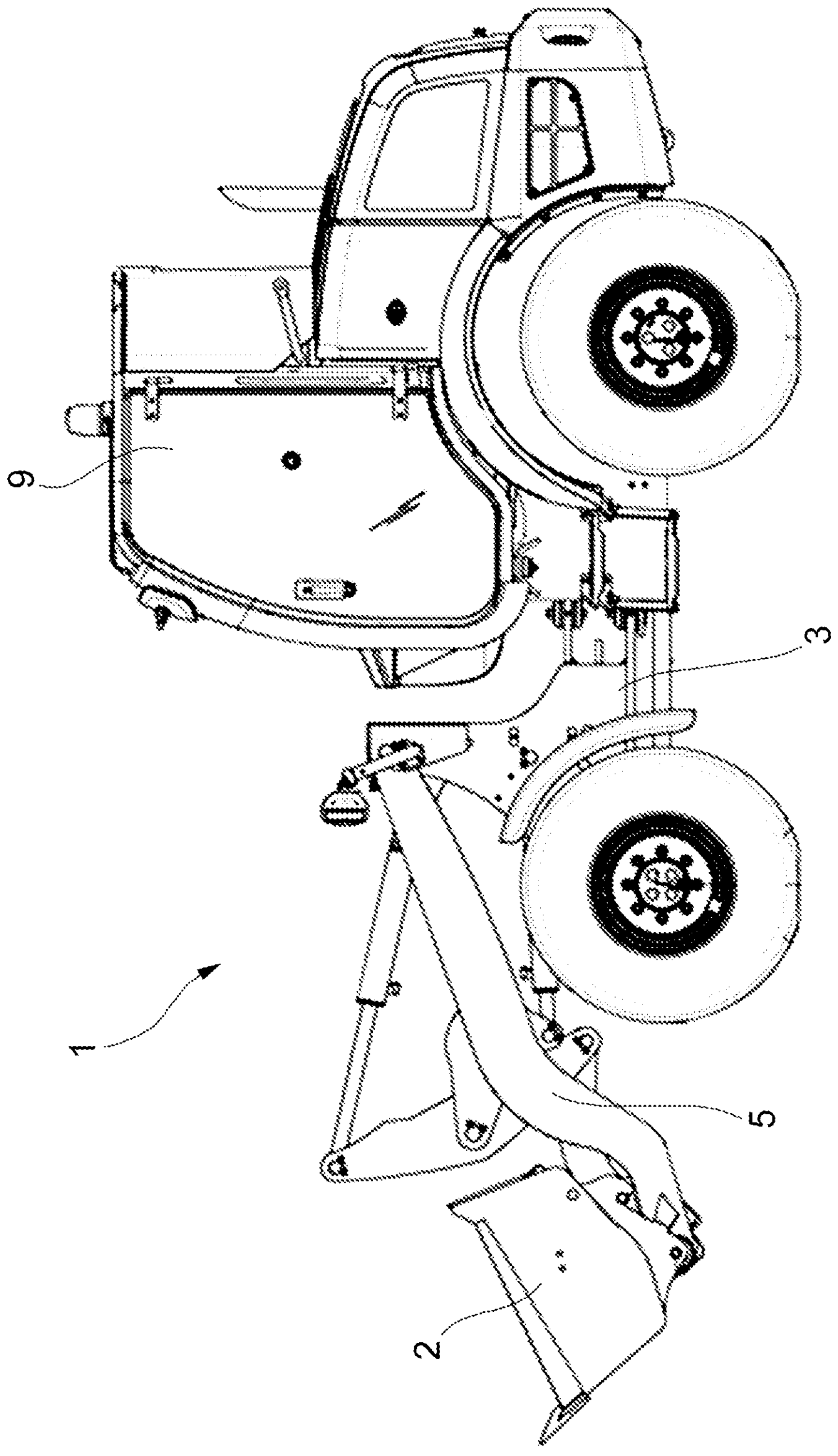
FIG.1 (PRIOR ART)
FIG. 1 shows a prior art exemplary work vehicle, in particular a compact wheel loader.
Figure 2:
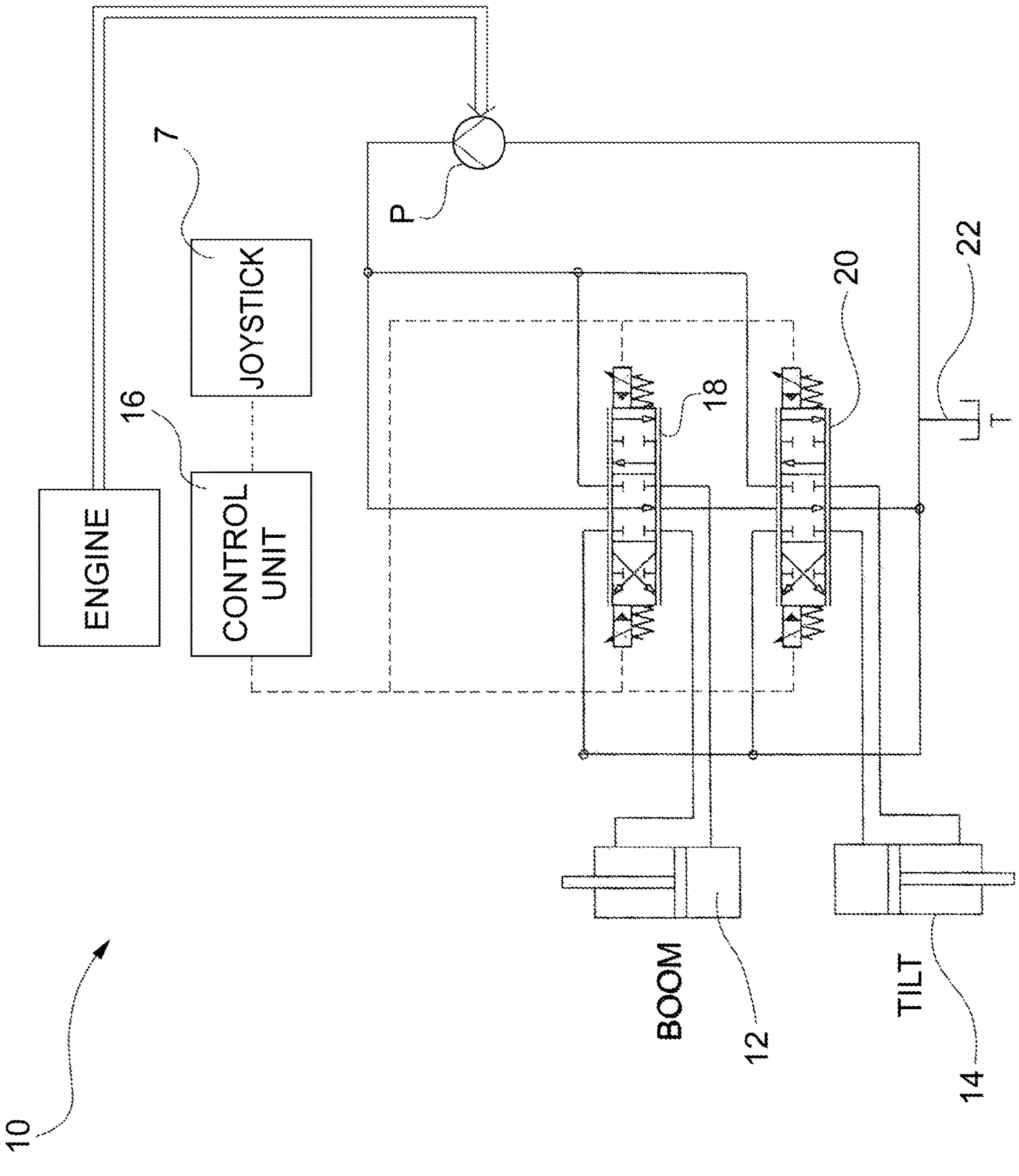
FIG.2 (PRIOR ART)
FIG. 2 shows a prior art control diagram of a work vehicle.
Figure 3:
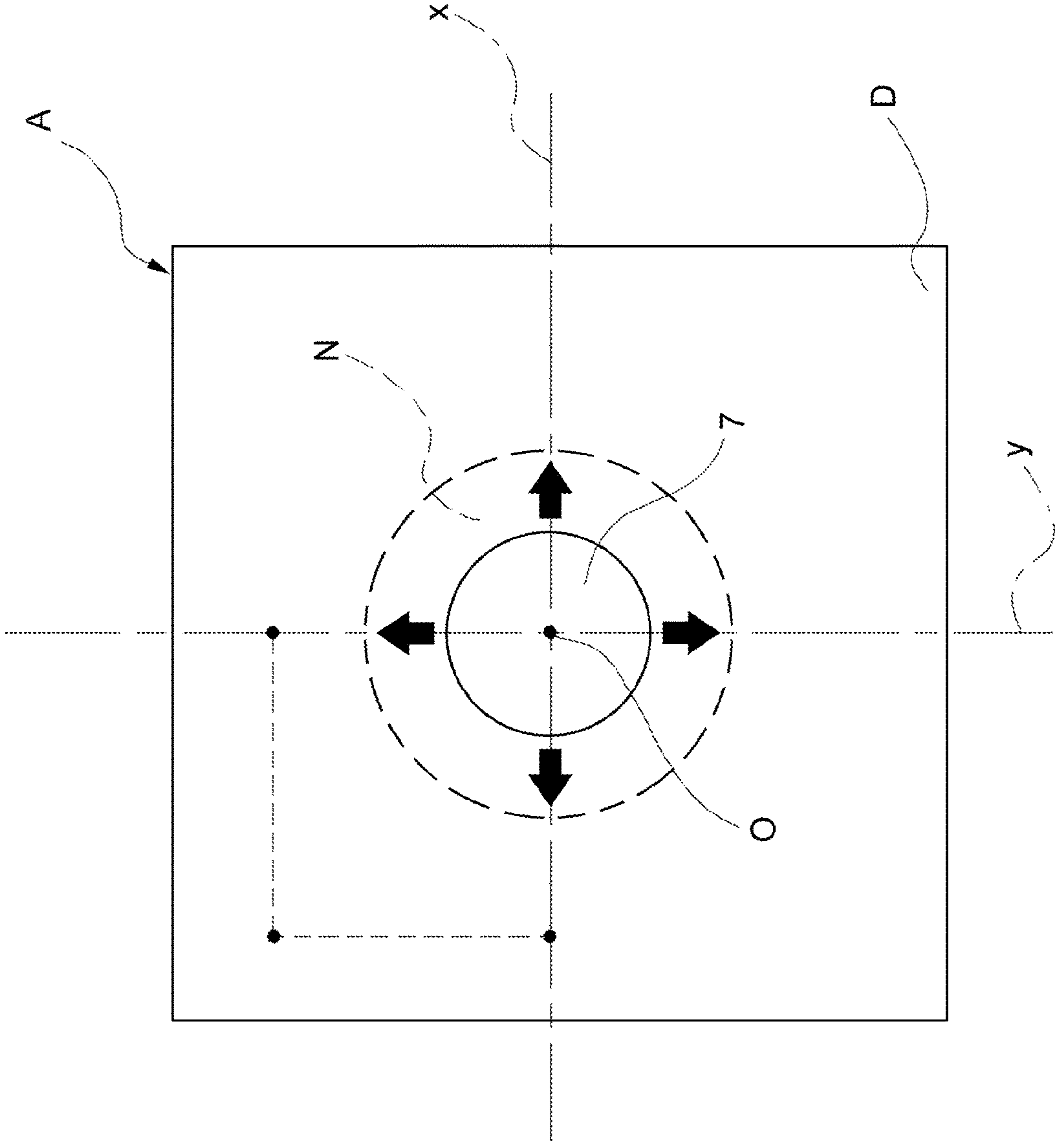
FIG.3 (PRIOR ART)
FIG. 3 shows a prior art exemplary joystick of a work vehicle.

As disclosed above and with further reference to FIG. 3, during normal operation, the actuation of the boom may occur by means of a joystick controlled by an operator. A movement of the joystick in the predetermined control area according to a preset axis y causes the actuation of the boom by hydraulic actuating means.

The hydraulic actuating means include an hydraulic cylinder operatively connected the boom, and a directional solenoid valve whose opening degree is adapted to control the flow of a working fluid to the at least one hydraulic cylinder.

An actuation of the boom is controlled by the opening degree of the directional solenoid valve by means of a driving current.

During normal operation, the driving current may be determined as a function of a component of the position of the joystick along said preset axis y in the control area.

However, according to present invention, the control method comprises the steps of:

determining that a floating function activation command 30 has been inputted by the operator;

when it is determined that the floating function activation command has been inputted by the operator:

a) acquiring a signal or data indicative of the current position of the boom along a travel path P of the boom over time, wherein the travel path include a first section between a boom full extension position A and a deceleration position B, a second section between the deceleration position B and a grounding position C, and a third section between the grounding position and a full retract position D;

b) moving the boom from the current position, determined based on the signal or data indicative of the position of the boom, to the full retract position, wherein:

I) when the boom is in the first section, moving the boom according to a first rate of actuation of the boom by means of a first value of driving current;

II) when the boom is in the second section, moving the boom according to a second rate of actuation of the boom, lower than said first rate of actuation of the boom, by means of a second value of driving current;

III) when the boom is in the third section, moving the boom according to the force of gravity, with a null-rate of actuation of the boom by means of a third value of driving current.

The third value of driving current being a value adapted to control the solenoid directional valve, so that the solenoid directional valve is internally moved in a position that connects the chambers of the boom cylinders to a fluid reservoir of the working fluid. Usually, the third value of driving current may be higher than the first value of driving current and the second value of driving current, in order to internally move the directional solenoid valve in its floating position.

The deceleration position B may be chosen in a way that it is as much as possible close to the grounding position C but without any contact between the attachment and the ground. Optionally, the deceleration position B may be set by the operator in the cab.

To determine the grounding position C, the control method may comprise the steps of:

a) based on the signal or data indicative of the position of the boom, determining if the boom is in the second section of the boom travel path;
b) based on the signal or data indicative of the position of the boom, determining a first position of the boom along the second section of travel path of the boom in a first time instant;
c) based on the signal or data indicative of the position of the boom, detecting a second position of the boom along the second section travel path of the boom in a second time instant, successive with respect to said first time instant;
d) determining a boom position difference between the second position and the first position of the boom;
e) if the determined boom position difference is lower than a predetermined boom position difference threshold, then the boom is in the grounding position C.

An exemplary travel path of the boom is shown in FIG. 6.

In a preferred embodiment, the control method may further comprise the step of acquiring a signal or data indicative of operating mode of the work vehicle over time. The operating mode may be also called boom aggressiveness mode. The value of the first rate of actuation and/or the second rate of actuation and/or any additional rates of actuation (when present) may be determined based on the operating mode indicated by said signal or data indicative of the operating mode of the work vehicle.

For example, the work vehicle may have a plurality of operating modes, selectable by the operator. The following explanation refers to an exemplary case of three different operating modes. In a first operating mode, e.g. low aggressiveness mode, a travel of the joystick from a first operating position to a second operating position along said preset axis y determines a variation of the driving current according to a first increasing or decreasing rate over time. In a second operating mode, e.g. medium aggressiveness mode, a travel of the joystick from the first operating position to the second operating position along said preset axis y determines a variation of the driving current according to a second increasing or decreasing rate over time, higher than the first increasing or decreasing rate. In a third operating mode, e.g. high aggressiveness mode, a travel of the joystick from the first operating position to the second operating position along said preset axis y determines a variation of the driving current according to a third increasing or decreasing rate over time, higher than the first and second increasing or decreasing rates.

In a further preferred embodiment, the step of acquiring a signal or data indicative of the current position of the boom along a travel path of the boom over time may include:

- acquiring the signal or data indicative of the current position of the boom by means of an angle detection sensor; or
- acquiring the signal or data indicative of the current position of the boom by means of a linear sensor coupled to a cylinder of the boom; or
- acquiring the signal or data indicative of the current position of the boom by means of a pressure sensor coupled to a bottom chamber of a cylinder of the boom.

The three possible solutions above are each a boom position sensor means, e.g. a boom position sensor 32.

In another preferred embodiment, the control method may further comprise the step of acquiring a signal or data indicative of the rotational speed of the motor of the work vehicle. The value of the first rate of actuation and/or the second rate of actuation and/or any additional rates of actuation (when present) may be determined based on the rotational speed indicated by said signal or data indicative of the rotational speed of the motor of the work vehicle.

The present invention relates also to a control system for a work vehicle, comprising:

- first input means adapted to receive at least a signal or data indicative of the position of the boom along a travel path of the boom;
- second input means adapted to receive a predetermined floating function activation command inputted by the operator by means of a command input means;
- first output means adapted to issue at least a signal indicative of driving current intended to control an opening degree of a directional solenoid valve of hydraulic actuating means of said boom.

The control system being arranged to carry out a control method according to any embodiment described above.

In addition, when the control method comprises the step of acquiring a signal or data indicative of operating mode of the work vehicle over time, the control system comprises a third input means adapted to receive a signal or data indicative of operating mode of the work vehicle over time. Further, in addition or alternatively, when the control method comprises the step of acquiring a signal or data indicative of the rotational speed of the motor of the work vehicle, the control system comprises an additional input means adapted to receive a signal or data indicative of the rotational speed of the motor of the work vehicle.

The present invention relates also to a work vehicle, in particular compact wheel loader, comprising:

- motor for propulsion of the work vehicle;
- a boom;
- a joystick operatively controlled by an operator for actuating the boom, the joystick being movable in a predetermined control area according to a preset axis y for actuating the boom;
- hydraulic actuating means for actuating the boom, wherein the hydraulic actuating means include at least one hydraulic cylinder operatively connected to the boom, and a directional solenoid valve whose opening degree is adapted to control the flow of a working fluid to the at least one hydraulic cylinder, the opening degree of said directional solenoid valve being operatively controlled by means of a driving current thereof;
- a hydraulic pump driven by the motor of the work vehicle to produce the hydraulic pressure of the working fluid;
- first sensor means for detecting the position of the boom along a travel path of the boom;
- a command input means arranged to allow to the operator to input a floating function activation command;
- a control system arranged to carry out a control method having the features described above.

In a preferred embodiment of the work vehicle the command input means may be:

- a button or a switch installed in the joystick; or
- a button or a switch installed inside the cabin of the vehicle; or
- a button or a switch installed in a dashboard of the work vehicle.

In a further preferred embodiment of the work vehicle, the first sensor means may be:

- an angle detection sensor; or a linear sensor coupled to a cylinder of the boom; or a pressure sensor coupled to a bottom chamber of a cylinder of the boom.

The example embodiments are described in sufficient detail to enable those of ordinary skill in the art to implement a control system in a work vehicle arranged to carry out the disclosed control method herein described.

Naturally, the principle of the invention remaining unchanged, the embodiments and the constructional details may vary widely from those described and illustrated purely by way of non-limiting example, without thereby departing from the scope of the invention as defined in the appended claims.

The invention claimed is:

1. A control method for executing a floating function of a boom in a work vehicle powered by a motor, wherein the actuation of the boom occurs by means of hydraulic actuating means including at least one hydraulic cylinder operatively connected the boom, and a directional solenoid valve whose opening degree is adapted to control the flow of a working fluid to the at least one hydraulic cylinder, and a rate of actuation of the boom is controlled by the opening degree of the directional solenoid valve by means of a driving current thereof, the control method comprising:

determining that a predetermined floating function activation command has been inputted by an operator by means of a command input means; and when it is determined that the floating function activation command has been inputted by the operator:

acquiring a signal or data indicative of the current position of the boom along a travel path of the boom over time, wherein the travel path include a first section between a boom full extension position and a deceleration position, a second section between the deceleration position and a grounding position, and a third section between the grounding position and a full retract position; and moving the boom from the current position, determined based on the signal or data indicative of the position of the boom, to the full retract position, wherein:

when the boom is in the first section, moving the boom according to a first rate of actuation of the boom by means of a first value of driving current, when the boom is in the second section, moving the boom according to a second rate of actuation of the boom, lower than said first rate of actuation of the boom, by means of a second value of driving current, and when the boom is in the third section, moving the boom according to the force of gravity, with a null-rate of actuation of the boom by means of a third value of driving current.

2. The control method according to claim 1, further comprising:

acquiring a signal or data indicative of an operating mode of the work vehicle over time, wherein at least one of the value of the first rate of actuation and the second rate of actuation is determined based on the operating mode indicated by said signal or data indicative of the operating mode of the work vehicle.

3. The control method according to claim 1, further comprising:

acquiring a signal or data indicative of a rotational speed of the motor of the work vehicle, wherein, at least one of the value of the first rate of actuation and the second rate of actuation is determined based on the rotational speed indicated by said signal or data indicative of the rotational speed of the motor of the work vehicle.

4. The control method according to any one of claim 1, wherein acquiring a signal or data indicative of the current position of the boom along a travel path of the boom over time comprises acquiring the signal or data indicative of the current position of the boom using an angle detection sensor.

5. The control method according to any one of claim 1, wherein acquiring a signal or data indicative of the current position of the boom along a travel path of the boom over time comprises acquiring the signal or data indicative of the current position of the boom using a linear sensor coupled to a cylinder of the boom.

6. The control method according to any one of claim 1, wherein acquiring a signal or data indicative of the current position of the boom along a travel path of the boom over time comprises acquiring the signal or data indicative of the current position of the boom using a pressure sensor coupled to a bottom chamber of a cylinder of the boom.

7. The control method according to claim 1, further comprising:

determining if the boom is in the second section of the boom travel path based on the signal or data indicative of the position of the boom;

determining a first position of the boom along the second section of travel path of the boom in a first time instant based on the signal or data indicative of the position of the boom;

detecting, based on the signal or data indicative of the position of the boom, a second position of the boom along the second section travel path of the boom in a second time instant, successive with respect to said first time instant;

determining a boom position difference between the second position and the first position of the boom; and determining that the boom is in the grounding position if the determined boom position difference is lower than a predetermined boom position difference threshold.

8. A control system for a work vehicle, comprising:

first input means for receiving at least a signal or data indicative of the position of a boom along a travel path of the boom;

second input means for receiving a predetermined floating function activation command inputted by an operator by means of a command input means; and first output means for issuing at least a signal indicative of driving current intended to control an opening degree of a directional solenoid valve of hydraulic actuating means of said boom;

the control system being configured to carry out a control method comprising:

determining that a predetermined floating function activation command has been inputted by the operator by means of a command input means; and when it is determined that the floating function activation command has been inputted by the operator:

acquiring a signal or data indicative of the current position of the boom along a travel path of the boom over time, wherein the travel path include a first section between a boom full extension position and a deceleration position, a second section between the deceleration position and a grounding position, and a third section between the grounding position and a full retract position; and moving the boom from the current position, determined based on the signal or data indicative of the position of the boom, to the full retract position, wherein:

when the boom is in the first section, moving the boom according to a first rate of actuation of the boom by means of a first value of driving current, when the boom is in the second section, moving the boom according to a second rate of actuation of the boom, lower than said first rate of actuation of the boom, by means of a second value of driving current, and when the boom is in the third section, moving the boom according to the force of gravity, with a null-rate of actuation of the boom by means of a third value of driving current.

9. The control system according to claim 8, further comprising third input means for receiving a signal or data indicative of operating mode of the work vehicle over time, the control method further comprising acquiring a signal or data indicative of an operating mode of the work vehicle over time, wherein at least one of the value of the first rate of actuation and the second rate of actuation is determined based on the operating mode indicated by said signal or data indicative of the operating mode of the work vehicle.

10. The control system according to claim 8, further comprising an additional input means for receiving a signal or data indicative of the rotational speed of the motor of the work vehicle, the control method further comprising acquiring a signal or data indicative of a rotational speed of the motor of the work vehicle, wherein, at least one of the value of the first rate of actuation and the second rate of actuation is determined based on the rotational speed indicated by said signal or data indicative of the rotational speed of the motor of the work vehicle.

11. A work vehicle, comprising a motor for propulsion of the work vehicle;

a boom;

a joystick operatively controlled by an operator for actuating the boom, the joystick being movable in a predetermined control area according to a preset axis for actuating the boom;

hydraulic actuating means for actuating the boom, wherein the hydraulic actuating means include at least one hydraulic cylinder operatively connected to the boom, and a directional solenoid valve whose opening degree is adapted to control the flow of a working fluid to the at least one hydraulic cylinder, the opening degree of said directional solenoid valve being operatively controlled by means of a driving current thereof;

a hydraulic pump driven by the motor of the work vehicle to produce the hydraulic pressure of the working fluid;

first sensor means for detecting the position of the boom along a travel path of the boom;

a command input means for receiving a floating function activation command from the operator;

a control system according to claim 8.

12. The work vehicle according to claim 11, wherein the command input means is a button or a switch.

13. The work vehicle according to claim 12, wherein the command input means is installed in the joystick.

14. The work vehicle according to claim 12, wherein the command input means is installed inside the cabin of the vehicle.

15. The work vehicle according to claim 12, wherein the command input means is installed in a dashboard of the work vehicle.

16. The work vehicle according to claim 11, wherein the first sensor means is an angle detection sensor.

17. The work vehicle according to claim 11, wherein the first sensor means is a linear sensor coupled to a cylinder of the boom.

18. The work vehicle according to claim 11, wherein the first sensor means is a pressure sensor coupled to a bottom chamber of a cylinder of the boom.

* * * * *